(12) United States Patent
Kuhnle et al.

(10) Patent No.: US 7,876,004 B2
(45) Date of Patent: Jan. 25, 2011

(54) ELECTRIC POWER TOOL WITH A ROTATABLE BRUSH PLATE

(75) Inventors: Axel Kuhnle, Freiberg A. N. (DE); Willy Braun, Neustetten (DE)

(73) Assignee: Robert Bosch GmbH, Stuttgart (DE)

( * ) Notice: Subject to any disclaimer, the term of this patent is extended or adjusted under 35 U.S.C. 154(b) by 268 days.

(21) Appl. No.: 12/122,868

(22) Filed: May 19, 2008

(65) Prior Publication Data

US 2008/0303358 A1    Dec. 11, 2008

(30) Foreign Application Priority Data

Jun. 5, 2007    (DE) .................... 10 2007 026 106

(51) Int. Cl.
*H02K 7/14*    (2006.01)
(52) U.S. Cl. ..................... 310/50; 310/89; 310/241
(58) Field of Classification Search .................. 310/50, 310/71, 89, 239–248; 173/217
See application file for complete search history.

(56) References Cited

U.S. PATENT DOCUMENTS

| | | | | |
|---|---|---|---|---|
| 5,089,729 | A  * | 2/1992 | Moores, Jr. ................... | 310/50 |
| 5,278,469 | A  * | 1/1994 | Weber et al. .................. | 310/89 |
| 5,918,370 | A  * | 7/1999 | Wells .......................... | 30/228 |
| 6,124,652 | A  * | 9/2000 | Karasa et al. ................. | 310/50 |
| 6,223,835 | B1 * | 5/2001 | Habedank et al. ............ | 173/217 |
| 6,357,533 | B1 * | 3/2002 | Buchholz et al. ............. | 173/217 |
| 6,364,033 | B1 * | 4/2002 | Hung et al. .................. | 173/217 |
| 6,412,572 | B2 * | 7/2002 | Habedank et al. ........... | 173/217 |
| 6,461,088 | B2 * | 10/2002 | Potter et al. ................. | 408/124 |
| 6,930,431 | B2 * | 8/2005 | Buck et al. ................... | 310/239 |
| 7,131,180 | B2 * | 11/2006 | Kopras et al. ................. | 29/560 |
| 7,355,314 | B2 * | 4/2008 | Riedl et al. .................. | 310/239 |

* cited by examiner

*Primary Examiner*—Thanh Lam
(74) *Attorney, Agent, or Firm*—Ronald E. Greigg

(57) ABSTRACT

The invention is based on an electrical power tool with an electrical machine, having a motor housing that receives the electrical machine and having a rotatable brush plate for reversing a direction of rotation of the electrical machine. The brush plate is covered in its cross section by a pivotable cover.

19 Claims, 4 Drawing Sheets

ELECTRIC POWER TOOL WITH A ROTATABLE BRUSH PLATE

REFERENCE TO FOREIGN PATENT APPLICATION

This application is based on German Patent Application No. 10 2007 026 106.5 filed 5 Jun. 2007, upon which priority is claimed.

BACKGROUND OF THE INVENTION

1. Field of the Invention

The invention is directed to an improved electrical power tool with a rotatable brush plate and with modules for an electrical power tool having a rotatable brush plate.

2. Description of the Prior Art

In electrical power tools, universal motors are typically used, in order to drive a tool insert that can be driven to rotate and/or in hammering fashion. As an electrical pickup on the commutator of the universal motor, so-called brush plates are used which hold carbon brushes that are electrically in contact with the commutator. For reversing the direction of rotation of the motor, rotatable brush plates are used. Upon rotation of the brush plate, not only is the current supply to the motor reversed in its polarization but the rotary position of the carbon brushes relative to the field windings is also changed, so that adequate commutation can be achieved for both directions of rotation.

SUMMARY OF THE INVENTION

The invention is employed in an electrical power tool having an electrical machine, having a motor housing that receives the electrical machine, and having a rotatable brush plate for reversing a direction of rotation of the electrical machine.

It is proposed that the brush plate be covered in its cross section by a pivotable cover. Especially advantageously, the cover can be held in captive fashion on the housing of the electrical power tool. The cover can be closed by simple, easily releasable means, for instance with a fastening screw and/or a latch or the like. It can favorably be provided that these means are connected to the brush plate in captive fashion. The arrangement is robust with regard to impact, dust, and vibrational stresses and is easy and safe to operate. Moreover, when space is tight, improvement in the operability of the electrical power tool can be attained.

Especially simple manipulation of the cover is possible if the cover is attached such that it can be pivoted perpendicular to its axis of rotation. The cover can simply be swung out of the way and can thus enable free access to the brush plate. Because of the easy accessibility of the brush plate, the ease of servicing the electrical power tool is improved. Changing carbon brushes of the brush plate can be done easily and quickly.

The compact, robust design is improved if a rotary actuation element for rotating the brush plate can be integrated with the cover. This makes it possible to dispose the cover, brush plate and rotary actuation element in an economical way that is not vulnerable to tolerances.

If the rotary actuation element can mesh with the brush plate with at least one slaving element that makes a connection in a manner secure against relative rotation possible between the actuation element and the brush plate, then the insensitivity to tolerances and the ease of use can be improved still further. Rotating the brush plate, or in other words reversing the direction of rotation of the electrical power tool, is simplified markedly.

Advantageously, the brush plate can be supported on a support dome of the motor housing. This allows a compact design of the electrical machine, which can preferably be embodied as a universal motor.

If the brush plate can be held in bistable fashion in each of two terminal positions, then a defined terminal point for the reversal can be attained. In a neutral position between the terminal positions, the brush plate can be removed in a simple way from its support, such as the support dome of the motor housing. In the terminal positions, hold-down devices, for instance, may be provided, under which the brush plate moves in its rotary motion and which secure the brush plate in its terminal position axially and optionally radially as well.

A first contact element associated with the brush plate, for electrically contacting a second contact element associated with the electrical machine, and the second contact element associated with the electrical machine, can both favorably be designed such that upon rotation of the brush plate, an electrical contact cannot occur until close to the respective terminal position. Preferably, the electrical contact is established at the earliest in the last 20%, and preferably at the earliest in the last 10%, of the range of rotation. Favorable commutation of the electrical machine is especially advantageously made possible as a result. The service life of the carbon brushes can be improved, and adherence to radio interference suppression limit values is thus possible without particular additional expense.

An economical design is attained if a preassembled brush cover module and/or a preassembled brush plate module and/or a preassembled motor housing module can be provided. Once the electrical power tool is put together, this design is compact, economical, and insensitive to tolerances. During the primary assembly period of the electrical power tool, the otherwise necessary work steps and storage locations are favorably dispensed with. The throughput time can thus be shortened, and production costs and assembly costs can be lowered.

Especially favorably, the proposed electrical power tool can be embodied as a percussion drill or a drill hammer, in particular of the high-performance type.

Furthermore, a brush cover module for an electrical power tool with an electrical machine, having a rotatable brush plate, is proposed, in which a cover is combined in preassembled fashion with a first rotary actuation element for rotating a brush plate and a second actuation element for actuating the first rotary actuation element.

In addition, a brush cover module for an electrical power tool with an electrical machine, having a rotatable brush plate, is proposed, in which the brush plate is combined in preassembled fashion with one or more holders, provided for receiving carbon brushes; spring elements are provided with contact pressure for acting upon the carbon brushes; and contact elements are provided for electrically contacting contact elements, external to the module, of an electrical machine.

In addition, a motor housing module for an electrical power tool with an electrical machine, having a rotatable brush plate, is proposed, in which the motor housing is combined in preassembled fashion with at least one contact element for electrically contacting a contact element external to the module, at least one pole piece, and at least one plug-in element for contacting electrical connections.

Because preassembled modules are furnished, the primary assembly of the electrical power tool can be made simpler and less expensive. In the event of repair, the particular module, such as the brush plate module, can simply be replaced, without a major time expenditure or cost.

The invention is especially suitable for electrical power tools of the L-type. It is fundamentally conceivable for the invention to be used for machines of other types as well in which a rotatable brush plate is used.

BRIEF DESCRIPTION OF THE DRAWINGS

The invention will be better understood and further objects and advantages thereof will become more apparent from the ensuing detailed description of a preferred embodiment, taken in conjunction with the drawings, in which.

DESCRIPTION OF THE PREFERRED EMBODIMENT

Figure 1:
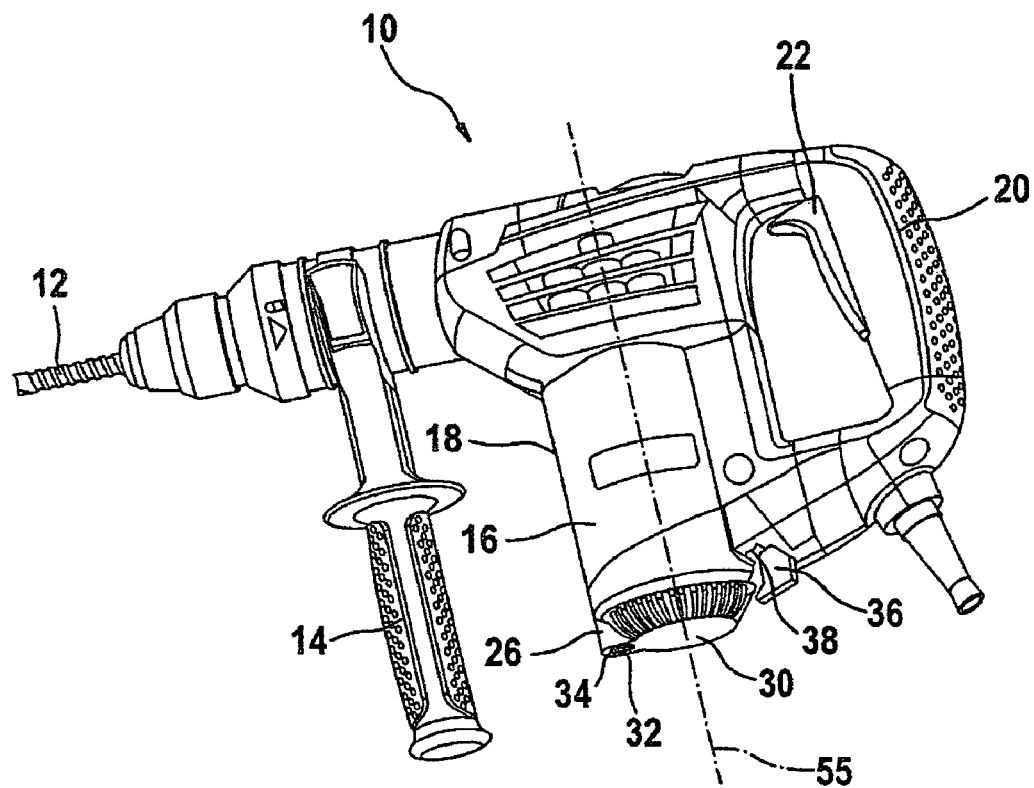
FIG. 1 is a perspective view of a preferred electrical power tool, in the form of a drill hammer embodying the invention.

In the drawings, elements that are the same or similar are identified by the same reference numerals.

FIG. 1, for explanation of the invention, shows a preferred electrical power tool 10, which is embodied for instance as a drill hammer of the L-type. The electrical power tool 10 can be held by a user by a first handle 14 and a second handle 20. On the second handle 20, there is a latch or pawl 22, with which the supply of current to an electrical machine (not visible) disposed in the housing shell 18 and operating as a motor can be enabled and a tool insert 12, which is disposed longitudinally of the electrical power tool 10, can be set into rotating and/or hammering operation. The handles 14 and 20 protrude transversely from the longitudinal axis of the tool insert. Between the two handles 14, 20, the electrical machine, not visible, is accommodated in a tool leg 16 which protrudes in a transverse direction 56 from the longitudinal axis, and the electrical machine itself extends in the transverse direction 56 of the tool leg 16. A cover 30 is disposed on the bottom 26 of the tool leg 16 and is secured to the tool leg 16 with a screw 32 disposed in a recess 34. Diametrically opposite the screw 32, an actuation element 36 can be seen in an opening 38. The opening 38 allows pivoting of the actuation element 36 out of the plane of the drawing.

Figure 2:
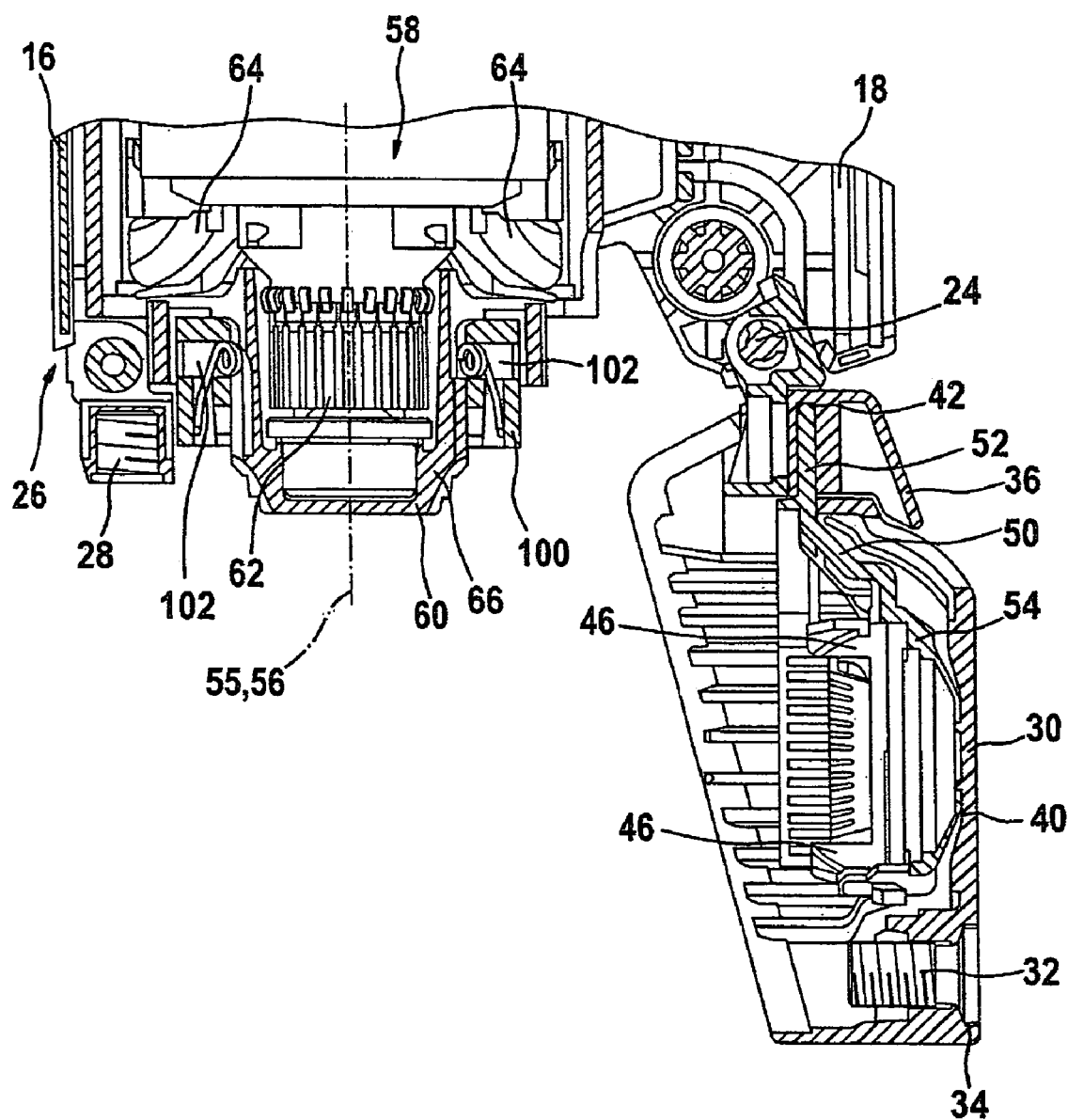
FIG. 2 is a detail of the electrical power tool of FIG. 1, with the cover swung open.

A detail of the bottom region of the tool leg 16 is shown in FIG. 2, in which the cover 30 shown in FIG. 1 is open and affords a view to a commutator 62 of the electrical machine 58, which is disposed in the tool leg 16, and of the pole pieces 64 which can be seen. A thread 28 on the housing, for receiving the screw 32, can be seen next to a brush plate 100 supported on a support dome 66 of a motor housing part 60. Perpendicular to the axis of rotation of the motor of the electrical machine 58, which axis extends parallel to the transverse direction 55, on both sides of the commutator 62 a respective quiver 102 of the brush plate 100 can be seen, and in these quivers carbon brushes (not visible) are held that, in the ON state of the electrical power tool transmit the electrical current to the commutator 62. The motor axis of rotation also corresponds to the axis of rotation 56 of the brush plate 100. Depending on the position of the brush plate 100, the electrical machine rotates clockwise or counterclockwise. Supporting the rotatable brush plate 100 with radial contact directly on the support dome 66 makes an exact course of the carbon brushes on the commutator 62 possible as well as constantly good contact between the electrical contacts (the contact element 68 and the contact element 120 in FIG. 3).

The cover 30 swung away from the bottom 26 of the tool leg 16 is pivotable about a support dome 24, acting as a pivot pin, of the housing shell 18.

The brush plate 100 is covered over its entire cross section by the cover 30 that is pivotable perpendicular to the axis of rotation 56 of the brush plate. The screw 32 is inserted in captive fashion, for instance clipped in place, into the opening 34.

A basket-shaped rotary actuation element 50 for rotating the brush plate 100 is integrated with the cover 30 and is inserted by its basket part 54 into an indentation 40 in the cover 30. With a laterally transversely protruding lug 52, the rotary actuation element 50 protrudes in captive fashion into an actuation element 36 embodied as a trigger. The lug 52 of the rotary actuation element 50 is introduced, upon insertion into the rotary actuation element 50, into a slit 42 in the cover 30 and clipped to the actuation element 36. Slaving elements 46, embodied as slaving lugs, of the rotary actuation element 50 are intended for engaging corresponding recesses, not visible, in the brush plate 100. The slaving elements 46 are disposed in such a way that the cover 30 can be closed again only whenever the rotary positions of the brush plate 100 and of the actuation element 36 embodied as a trigger match, thus making a connection possible, in a manner secure against relative rotation, between the rotary actuation element 50, rigidly connected to the actuation element, and the brush plate 100.

Rotation of the brush plate 100 is effected in such a way that with the cover 30 closed, the actuation element 36, embodied as a trigger, is pivoted in the opening 38 in the tool leg 16 from a first terminal position into an opposite terminal position. Each terminal position corresponds to one defined current direction and hence direction of rotation of the electrical machine 58.

The cover 30 advantageously forms a preassembled module (the brush cover module), which can be inserted already preassembled during the primary assembly of the electrical power tool.

By loosening the screw 32 and swinging the cover 30 out of the way, the brush plate 100 is freely accessible and can be removed from the tool leg 16, for instance for servicing purposes. Details of the brush plate 100 can be found in FIG. 3, which shows a plan view on a bearing flange 72, with the brush plate 100 supported on the support dome 66 (FIG. 4). From the plan view, the compact design of the brush plate 100 is apparent.

Two diametrically disposed quivers 102 each hold one carbon brush 104, and the carbon brushes are pressed against the commutator 62 of the electrical machine 58 by means of legs 114 of spring elements 106 embodied as spiral springs. The quivers 102 are braced on the brush plate 100 together with radially acting spring elements 118, 120 embodied as contact springs. The spring elements 118, 120 are disposed symmetrically about each quiver 102 and are each in radial contact with a respective one of two diametrically opposed contact plates 68, which in turn are electrically connected to the pole piece 64 (FIG. 2). The term pole piece 64 is used synonymously here with the stator of the electrical machine. Depending on the position of the brush plate 100, one or the other contact plate 68 is contacted by the springs 118, 120. Of the contact plate 68, all that can be seen in the plan view is one leg 68a.

The brush plate 100 is in a first terminal position 108. If the brush plate 100 is pivoted to the other terminal position 110, the direction of rotation of the electrical machine changes. Between the terminal positions 108 and 110, a free space 112 is provided, which allows pivoting of the brush plate 100. The specific angle of the pivoting range 114 depends on the winding arrangements used at present for the particular electrical machine 58. In a neutral position between the terminal positions 108, 110, the brush plate 100 can be simply lifted from the support dome 66.

Figure 3:
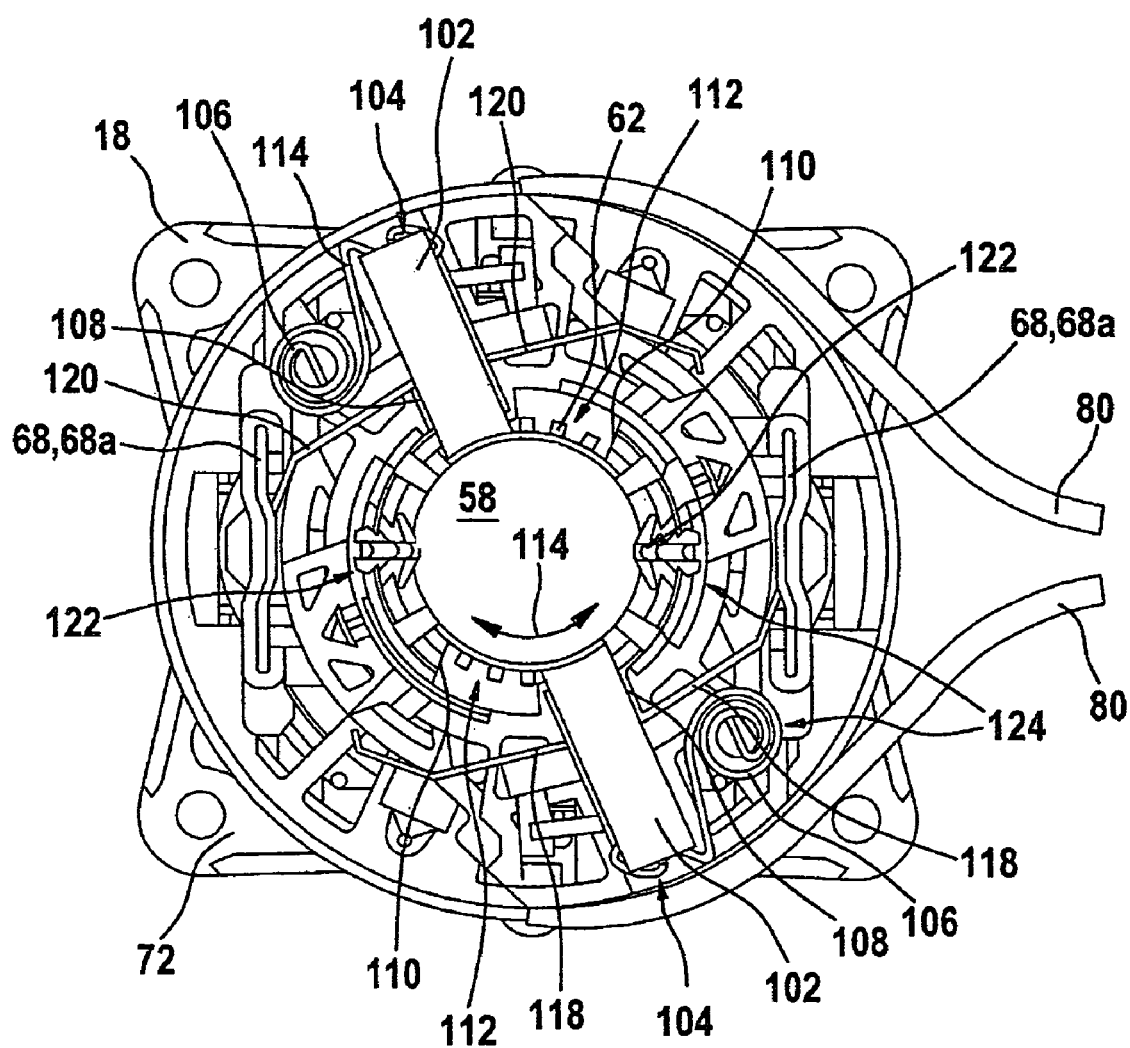
FIG. 3 is a plan view on a bearing flange with a brush plate placed on it of the electrical power tool of FIG. 1.
Figure 4:
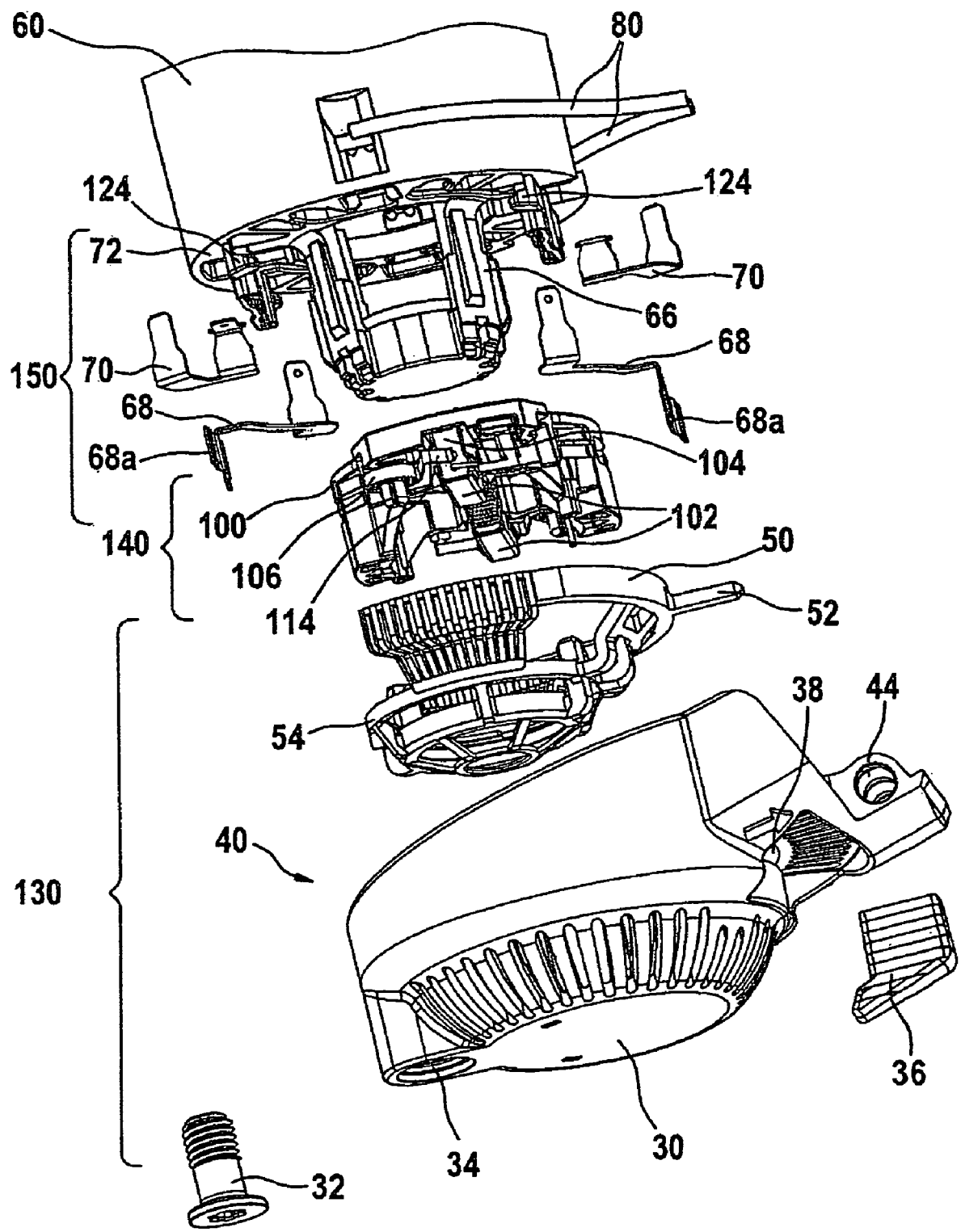
FIG. 4 shows components of the preferred electrical power tool of FIG. 1 in an exploded view.

The contact element 120 associated with the brush plate 100 is intended for electrical contacting of the contact element 70 (FIG. 4), which is largely concealed in FIG. 3, associated with the electrical machine 58. Both contact elements are designed such that upon rotation of the brush plate 100, an electrical contact cannot occur until close to the respective terminal position 108, 110. As a result, it can be assured that the brush plate 100 can be operated only in its defined terminal positions 108, 110, which contributes to high-quality commutation.

To maintain the movability of the brush plate 100 under operating conditions, such as a heavy burden of dust, the brush plate is guided both radially and axially on only narrow strips. By means of two diametrically opposed leg springs 122, the brush plate is held stably in its respective terminal positions 108, 110. Axially, the brush plate is fixed by each of four paired, diametrically opposed hold-down devices 124 integrated with the motor housing 60. In the terminal positions 108, 110, a portion of the brush plate 100 moves underneath the respective hold-down device 124, while in the neutral position between the terminal positions 108, 110, no axial fixation takes place.

FIG. 4, for the sake of clearly showing the arrangement, is an exploded view of the components described in FIGS. 1 through 3. The cover 30, brush plate 100, and motor housing 60 are preferably components of preassembled modules 130, 140, 150. It is advantageous to use these modules 130, 140, 150 in the primary assembly of the electrical power tool.

The preferred brush cover module 130 preferably includes the cover 30, with the actuation element 36, the screw 32, and the rotary actuation element 50, which are connected to one another in captive fashion.

The preferred brush plate module 140 preferably includes the brush plate 100, with one or more quivers provided for receiving carbon brushes; spring elements 106 provided with contact pressure for acting upon the carbon brushes 104; and contact elements 120 (FIG. 3), for electrically contacting contact elements 68 of the electrical machine that are external to this module.

The preferred motor housing module 150 preferably includes the motor housing 60, inserted into the housing shell 18, with at least one contact element 68, for electrically contacting a contact element 120 (FIG. 3) that is external for this module; with at least one pole piece 64; and with at least one plug-in element 70, for contacting, for contacting electrical connections 80. The leg 68a of the contact element 68, in the assembled state, protrudes into the brush plate 100 (FIG. 3). The pole piece 64, the two contact elements 68 embodied as contact plates, and two plug-in plates 70 can be press-fitted into the motor housing 60 in a single work step, saving both time and expense. The contact plates 68 and the plug-in plates 70 have no barbs with which they could become firmly caught in the plastic of the motor housing 60. The plug-in plates 70 are embodied in bail-like fashion, and plug-in lugs protrude away to one side of the bail. In the installed state, the plug-in lugs protrude laterally out of the motor housing 60, so that before the motor pot of the electrical machine 58 is placed in the housing shell 18 (FIG. 3), the two electrical connection lines 80 can be slipped on.

The foregoing relates to a preferred exemplary embodiment of the invention, it being understood that other variants and embodiments thereof are possible within the spirit and scope of the invention, the latter being defined by the appended claims.

We claim:

1. An electrical power tool with an electrical machine, comprising a motor housing receiving the electrical machine, a rotatable brush plate movable between two terminal positions for reversing a rotary direction of the electrical machine, and a pivotable cover covering brush plate in its cross section.

2. The electrical power tool as defined by claim 1, further comprising means supporting the cover for pivotable movement perpendicularly to its axis of rotation.

3. The electrical power tool as defined by claim 1, wherein the cover comprises an integral rotary actuation element for rotating the brush plate.

4. The electrical power tool as defined by claim 2, wherein the cover comprises an integral rotary actuation element for rotating the brush plate.

5. The electrical power tool as defined by claim 3, wherein the rotary actuation element comprises at least one slaving element for engaging the brush plate, which at least one slaving element enables a connection, in a manner secure against relative rotation, between the actuation element and the brush plate.

6. The electrical power tool as defined by claim 4, wherein the rotary actuation element comprises at least one slaving element for engaging the brush plate, which at least one slaving element enables a connection, in a manner secure against relative rotation, between the actuation element and the brush plate.

7. The electrical power tool as defined by claim 1, wherein the motor housing comprises a support dome, and wherein the brush plate is supported on the support dome.

8. The electrical power tool as defined by claim 3, wherein the motor housing comprises a support dome, and wherein the brush plate is supported on the support dome.

9. The electrical power tool as defined by claim 4, wherein the motor housing comprises a support dome, and wherein the brush plate is supported on the support dome.

10. The electrical power tool as defined by claim 1, further comprising means holding the brush plate in bistable fashion in each of two terminal positions.

11. The electrical power tool as defined by claim 3, further comprising means holding the brush plate in bistable fashion in each of two terminal positions.

12. The electrical power tool as defined by claim 5, further comprising means holding the brush plate in bistable fashion in each of two terminal positions.

13. The electrical power tool as defined by claim 1, further comprising a contact element associated with the electric machine, a contact element, associated with the brush plate for electrically contacting the contact element associated with the electrical machine, and means supporting the contact element associated with the electrical machine such that upon rotation of the brush plate, an electrical contact cannot occur until close to the respective terminal position.

14. The electrical power tool as defined by claim 4, further comprising a contact element associated with the electric machine, a contact element, associated with the brush plate for electrically contacting the contact element associated with the electrical machine, and means supporting the contact element associated with the electrical machine such that upon rotation of the brush plate, an electrical contact cannot occur until close to the respective terminal position.

15. The electrical power tool as defined by claim 5, further comprising a contact element associated with the electric machine, a contact element, associated with the brush plate for electrically contacting the contact element associated with the electrical machine, and means supporting the contact element associated with the electrical machine such that upon rotation of the brush plate, an electrical contact cannot occur until close to the respective terminal position.

16. A brush cover module for an electrical power tool with an electrical machine, the module comprising a cover combined in preassembled fashion with a first rotary actuation element for rotating a brush plate and a second actuation element for actuating the first rotary actuation element.

17. A brush plate module for an electrical power tool with an electrical machine, the module comprising a rotatable brush plate combined in preassembled fashion with one or more holders for receiving carbon brushes, spring elements providing contact pressure acting upon the carbon brushes, and contact elements for electrically contacting contact elements, external to the module, of an electrical machine.

18. A motor housing module for an electrical power tool with an electrical machine, having a rotatable brush plate, the improvement wherein the motor housing is combined in preassembled fashion with at least one contact element for electrically contacting a contact element external to the module, at least one pole piece, and at least one plug-in element for contacting electrical connections.

19. The electrical power tool as defined in claim 15, further comprising a housing module for an electrical power tool with an electrical machine, having a rotatable brush plate, the improvement wherein the motor housing is combined in preassembled fashion with at least one contact element for electrically contacting a contact element external to the module, at least one pole piece, and at least one plug-in element for contacting electrical connections.

* * * * *